United States Patent
Dresevic et al.

(12) 
(10) Patent No.: US 6,253,374 B1
(45) Date of Patent: Jun. 26, 2001

(54) METHOD FOR VALIDATING A SIGNED PROGRAM PRIOR TO EXECUTION TIME OR AN UNSIGNED PROGRAM AT EXECUTION TIME

(75) Inventors: Bodin Dresevic, Bellevue; Donald D. Chinn, Redmond; Gregory C. Hitchcock, Woodinville, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/109,448

(22) Filed: Jul. 2, 1998

(51) Int. Cl.$^7$ .................................................. G06F 9/445
(52) U.S. Cl. ................................................ 717/11; 717/8
(58) Field of Search ........................... 395/712; 345/471; 364/265.5; 380/51; 382/306, 135; 707/103; 709/213, 303; 717/11, 8

(56) References Cited

U.S. PATENT DOCUMENTS

| | | | |
|---|---|---|---|
| 5,226,148 | * 7/1993 | Littlewood | 364/265.5 |
| 5,291,243 | * 3/1994 | Heckman et al. | 399/3 |
| 5,414,812 | * 5/1995 | Filip et al. | 707/103 |
| 5,504,822 | * 4/1996 | Holt | 382/135 |
| 5,606,609 | * 2/1997 | Houser et al. | 382/306 |
| 5,748,960 | * 5/1998 | Fischer | 709/316 |
| 5,781,714 | * 7/1998 | Collins et al. | 345/471 |
| 5,912,974 | * 6/1999 | Holloway et al. | 380/51 |
| 5,949,975 | * 9/1999 | Batty et al. | 709/213 |

* cited by examiner

*Primary Examiner*—Mark R. Powell
*Assistant Examiner*—Hoang-Vu Antony Nguyen-Ba
(74) *Attorney, Agent, or Firm*—John S. Pratt, Esq.; Kilpatrick Stockton LLP

(57) ABSTRACT

Validating a signed program prior to execution time or an unsigned program at execution time. A program is validated by checking the input parameters to the instructions of the program to prevent errors associated with executing an instruction using an invalid input parameter. Both signed programs and unsigned programs are accommodated. A signed program is validated during the signing process, whereas an unsigned program is validated at execution time.

15 Claims, 6 Drawing Sheets

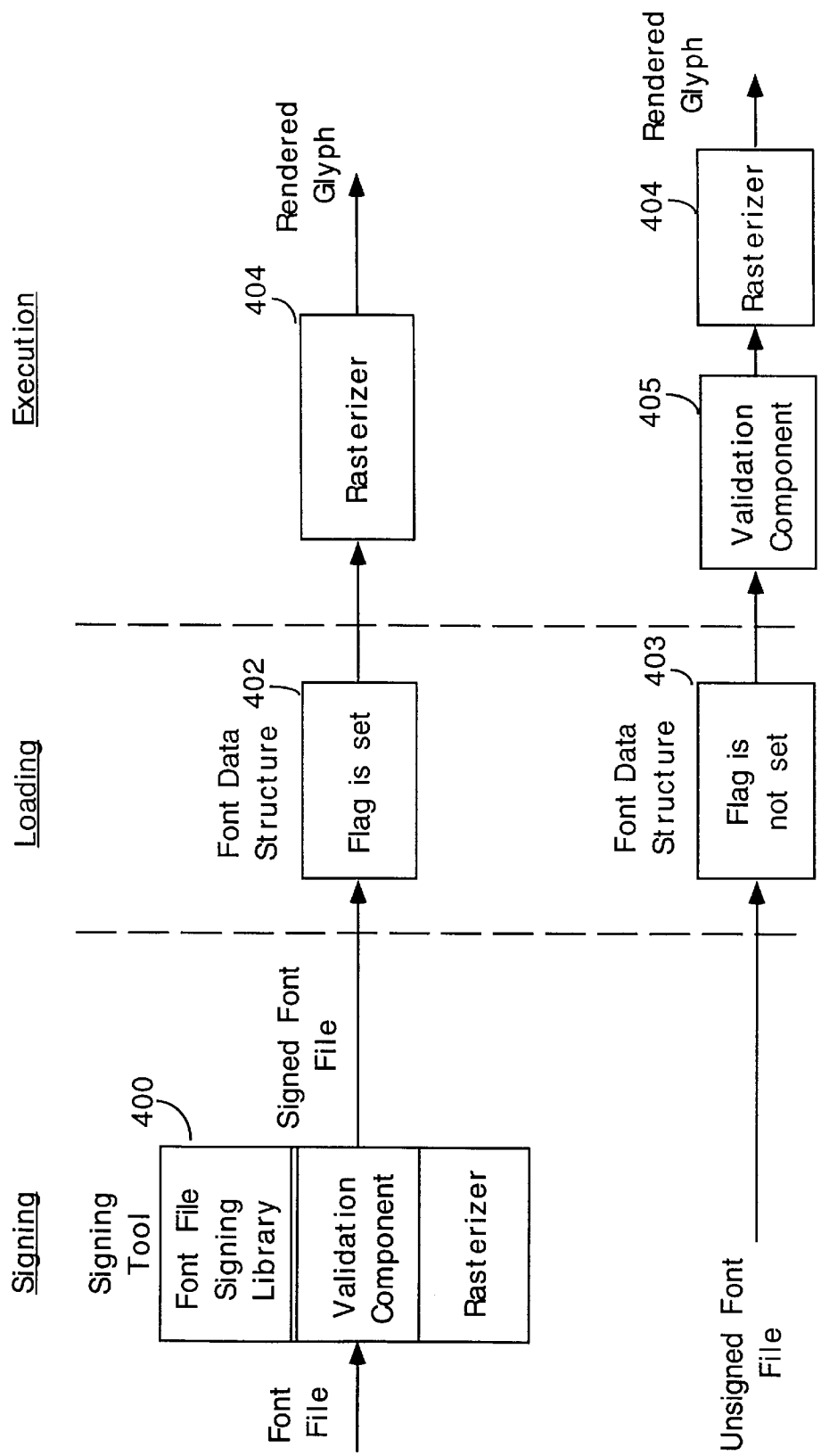

METHOD FOR VALIDATING A SIGNED PROGRAM PRIOR TO EXECUTION TIME OR AN UNSIGNED PROGRAM AT EXECUTION TIME

FIELD OF THE INVENTION

This invention relates in general to validating a program, and more particularly to validating a signed program prior to execution time and an unsigned program at execution time.

BACKGROUND OF THE INVENTION

As more and more people rely upon computers to perform a variety of tasks, the importance of system reliability or system robustness increases. Ideally, a computer should operate without error. However, in reality, errors occur during operation. Therefore, the key to increasing system robustness is decreasing the number of errors.

One factor that can negatively impact system robustness is the execution of an invalid program. If an invalid program is executed, then an error can occur. The severity of the error is unpredictable. A benign error might cause an error message to be presented to the user. However, a more serious error might require that the user restart the computer. Therefore, to increase system robustness, the execution of an invalid program should be prevented.

A computer user can obtain files containing executable programs from a number of different sources, including downloading files from a network, such as the Internet. A program obtained from a familiar source, such as an established computer software company, is more likely to have undergone extensive testing and debugging to ensure that the program is valid, than a program obtained from an unfamiliar source, such as an unknown author of an Internet page.

One possible solution to the problem of executing an invalid program would be to only execute programs that have been validated. If a program is signed, then the program could be validated during the signing process. A set of inputs to the program could be tested as a prerequisite to signing the program. If the program can execute without error for the tested set of inputs, then a digital signature would be associated with the program to indicate that the program is valid for the tested set of inputs. To prevent the execution of an invalid program, only signed programs would be executed. A drawback to this solution is that there are many valid programs that are not signed. These programs are commonly referred to as legacy programs. If only signed programs are allowed to be executed, then legacy programs cannot be executed, even though many of the legacy programs are valid. Thus, there is a need in the art for a method for preventing the execution of an invalid program that allows the execution of both signed and unsigned programs.

Another possible solution to the problem of executing an invalid program would be to check the input parameters to the instructions of the program before executing the instructions. A program is invalid if the parameters used by any of the instructions of the program during execution are invalid. Therefore, the input parameters used by an instruction could be checked before the instruction is executed to prevent the execution of an invalid program. A disadvantage of this solution is that it is slow. Typically, the performance of a program is critical at the time the program is executed. If the input parameters to each instruction are checked before each instruction is executed, then the parameter checking degrades the performance of the program. Thus, there is also a need in the art for a method for preventing the execution of an invalid program without the delay associated with parameter checking.

SUMMARY OF THE INVENTION

The present invention meets the needs described above by providing a method for validating both signed and unsigned programs. A program is validated by checking the input parameters to the instructions of the program to prevent errors associated with executing an instruction using an invalid input parameter. A signed program is validated during the signing process, whereas an unsigned program is validated when it is executed. By validating a program when the program is signed, the execution performance of the signed program is not adversely affected.

To validate a program during the signing process, the input parameters to the instructions of the program are checked to detect invalid parameters that could cause a system error. The input parameters are checked for a predetermined range of inputs to the program. As used herein, the term "input parameter" refers to a parameter used by an instruction of the program and the term "input to the program" refers to a parameter used by the program as a whole. An input to the program determines the input parameters to the instructions of the program. In addition to checking the input parameters, the structure of the file that contains the program can also be checked to determine whether the file satisfies any structural requirements. If no errors are detected in the input parameters and the file is structurally correct, then the file is signed. The file is signed by associating a digital signature with the file. If an error is detected in the input parameters or the file is structurally flawed, then the program is not signed.

In one embodiment of the invention, the program is written using an interpreted computer language, such as the "TrueType" computer language, the "JAVA" computer language, or the "PostScript" computer language. If the program is written using the TrueType computer language, then the instructions of the program are commonly referred to as hints. Hints are written in a font language, such as TrueType, and specify how a glyph outline is to be rendered. When a glyph is rasterized, the hints of the glyph are executed. To validate a font file including hints, the rasterizer rasterizes all of the glyphs of the font within a predetermined size range to determine whether the input parameters to the hints are valid. The size range is determined so that the most common glyph sizes are within the range. In the case of a TrueType font file, the size range is the input to the program and determines the input parameters to the hints.

A determination is also made as to whether the structure of the font file satisfies the structural requirements specified by the TrueType specification. If the input parameters to the hints are valid and the structure of the font file is valid, then the font file is signed. Otherwise an error occurs and the font file is not signed. Preferably, if an error occurs, an error message is generated that identifies the failing glyph.

To prevent the execution of an invalid program, the program is checked prior to execution to determine whether the program has been validated for a given program input. If the program was validated when the program was signed, then the program can be executed without repeating the validation. However, if the program was not previously validated, then the program is validated at the time of execution to prevent the execution of an invalid program.

In response to a request to load the program, the program is checked to determine whether a valid digital signature is associated with the program. If a valid digital signature is associated with the program, then a flag is set indicating that the program is valid and the program is loaded. If the program is not associated with a valid digital signature, then for each instruction of the program, the input parameters to the instruction are checked prior to executing the instruction.

After the program is loaded and a request to execute the program using a selected input to the program is detected, then the flag is checked to determine whether the program is valid. If the flag is set, then the selected input is compared to the predetermined range of inputs to the program. The predetermined range of inputs is the same range of inputs as used to validate the program at signing time. If the selected input is within the predetermined range of inputs to the program, then the program is executed using the selected input without further validation. If the flag is not set or the selected input is not within the predetermined range of inputs, then input parameter checking is performed for each instruction of the program prior to executing the instruction.

The overhead of validating a signed program is incurred during the signing process, whereas the overhead of validating an unsigned program is incurred when the program is executed. Because performance is more critical at execution time than at signing time, it is preferable to validate a program during the signing process.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIG. 4 is a block diagram comparing the steps for validating a signed program with the steps for validating an unsigned program.

DETAILED DESCRIPTION

The present invention is directed to a method for validating a signed program prior to execution time and an unsigned program at execution time. Briefly described, a program is validated by checking the input parameters to the instructions of the program to determine whether the input parameters are valid. The method accommodates both signed programs and unsigned programs. A signed program is validated during the signing process, whereas an unsigned program is validated when it is executed. By validating a program when it is signed, the signed program does not incur any delay for validation at execution time. The present invention is particularly well-suited to programs written in interpreted computer languages, such as the "TrueType" computer language, the "Java" computer language and the "PostScript" computer language.

Exemplary Operating Environment

Figure 1:
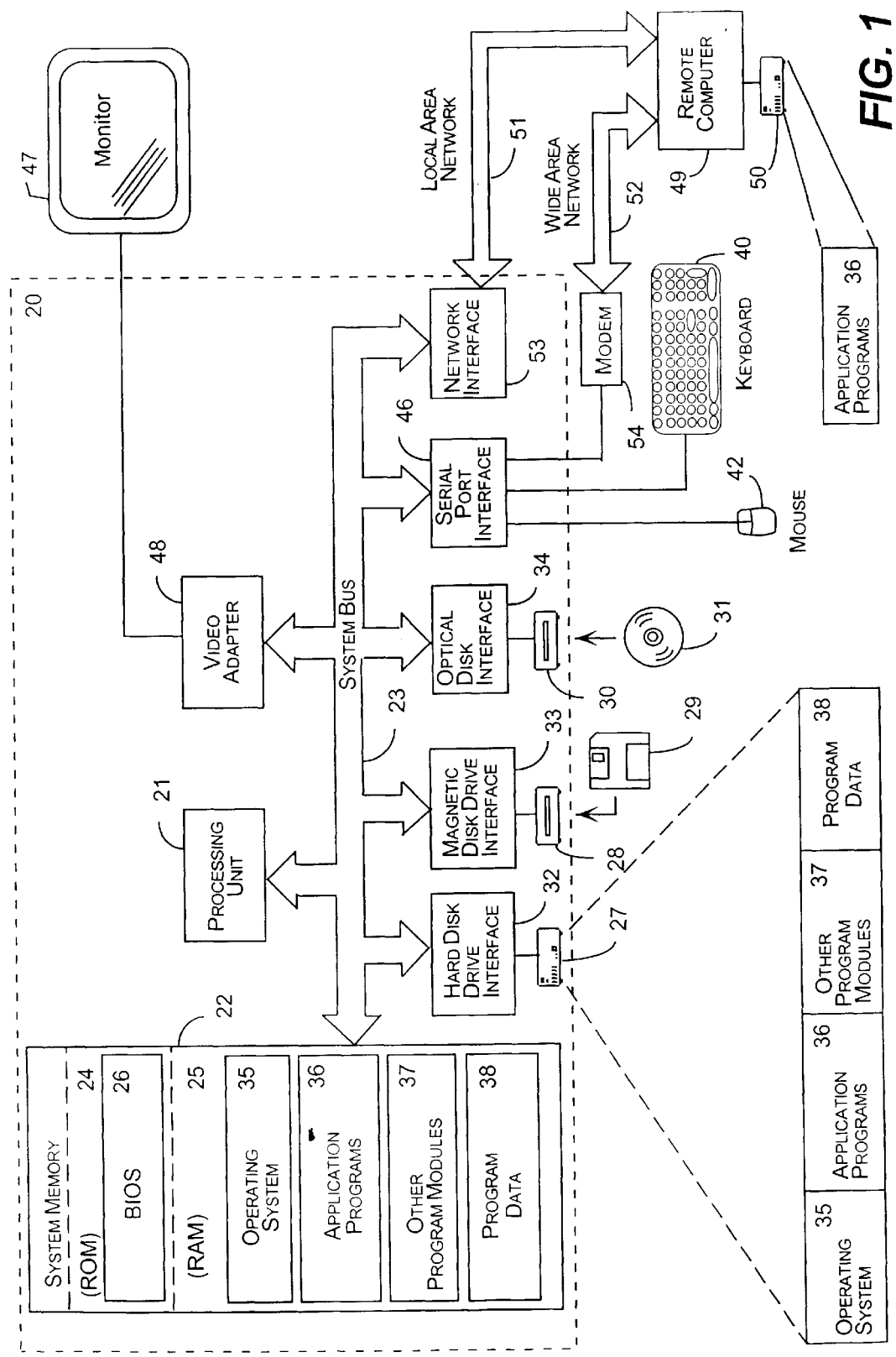
FIG. 1 is a block diagram of a personal computer illustrating the operating environment for an embodiment of the present invention.

FIG. 1 and the following discussion are intended to provide a brief, general description of a suitable computing environment in which the present invention may be implemented. Although not required, the invention will be described in the general context of computer-executable instructions, such as a program module or file, running on a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Validating a Font File

In one embodiment, the method is used to validate a font file that contains hints prior to using the hints to render a glyph on an output device, such as a monitor or a printer. A glyph is a representation of one or more characters. A single glyph may represent a single character, such as the lower-case letter "f", or a single glyph may represent a string of characters, such as the ligature "fi". A hint is an instruction, written in a font language, such as the TrueType language, that specifies how a glyph outline, scaled to a particular size, is to be adjusted on the target output device.

To display or print a glyph, the glyph outline is first scaled to the selected font size and the resolution of the output device. The scaled glyph outline is digitized or scan-converted to create a bitmap. Finally, the bitmap is rendered on an output device, such as a monitor or a printer, using a regularly spaced grid of picture elements ("pixels"). Scaling the glyph outline may not produce satisfactory results at all point sizes. To compensate for the scaling, hints are added to the font to improve the appearance of the glyph. Hints typically control distances, proportions and pixel patterns. To validate a font file, the rasterizer rasterizes all of the glyphs of the font within a predetermined size range to determine whether the input parameters to the hints are valid.

For a TrueType font, a hint can be specified using an assembly-type language, such as the TrueType Instruction Set, or a high-level abstraction of the TrueType Instruction Set, such as Type Man Talk. An example of a hint is a link command. A link connects two control points on the glyph outline over a flexible distance in either the x-direction or the y-direction. A link begins at a parent control point and ends at a child control point. A link determines the location of the child control point relative to the parent control point. The basic syntax for a Type Man Talk link command in the x-direction is XLink(point1, point2, [cvt1]), where point1 is the parent control point, point2 is the child control point, and cvt1 is the optional cvt value. If the input parameters (point1, point2, cvt1) to the XLink command are invalid, then the hint is invalid and the execution of the hint may cause a system error. For example, if a link command includes a control point numbered 100, but the largest allowable control point number is 50, then the link command is invalid.

An invalid hint can cause a poorly rendered glyph or even a system error. The method for validating a font file distinguishes between invalid hints that cause a poorly rendered glyph and invalid hints that cause a system error. An invalid hint that affects the quality of a rendered glyph does not invalidate the font file, whereas an invalid hint that affects system robustness invalidates the font file.

In addition to checking the input parameters to the hints, the structure of the font file is checked. To check the structure of the font file, the structure is compared to the structure specified by the font specification. For example, the structure of a TrueType font file is defined by the TrueType specification. If the font file is a TrueType font file, then the font file is checked to determine whether the font file contains the minimal set of tables required by the TrueType specification. Also, the offsets in the font file are checked to determine whether any of the offsets reach beyond the end of the font file, the tables in the font file are checked to determine whether all of the tables start on 4-byte boundaries, and the table tags in the table directory are checked to determine whether the table tags are in alphabetical order. The checksums stored in the font file also can be checked to determine whether the checksums are correct. As will be apparent to those skilled in the art, additional types of structural checking can also be performed.

There is a general trend in the software industry to sign files. Therefore, it is anticipated that most font files shipped in the future will be signed. A font file can be validated during the signing process. If a font file is validated at the time it is signed, then the font file can be used to render glyphs in the predetermined range of sizes without further validation.

However, not all font files are signed. An unsigned font file is referred to herein as a legacy font file. Because legacy font files are not signed, there needs to be a means to validate a legacy font file prior to using the font file to render a glyph. The present invention provides a method for validating a legacy font file at the time the font file is used to render a glyph.

Validating a Program During the Signing Process

A program can be validated at the time the program is signed. Typically, a program is signed at the end of the program creation process by inputting the program into a signing tool. Signing a program adds negligible time to the program creation process.

A signing tool links to different signing libraries for different types of programs. For example, one of the signing libraries can support the signing of a font file, whereas a different signing library supports the signing of another type of program, such as a program written using the "Java" computer language. To validate a font file at the time the font file is signed, the font file signing library includes a validation component and a rasterizer. The validation component checks the input parameters to the hints of the font file to detect invalid input parameters that could cause a system error. Preferably, the validation component does not check the font file to detect a benign error that only affects the quality of the rendered font. An example of a benign error is an error that is caused by the incorrect usage of a hint, but does not affect system reliability or system robustness.

Figure 2:
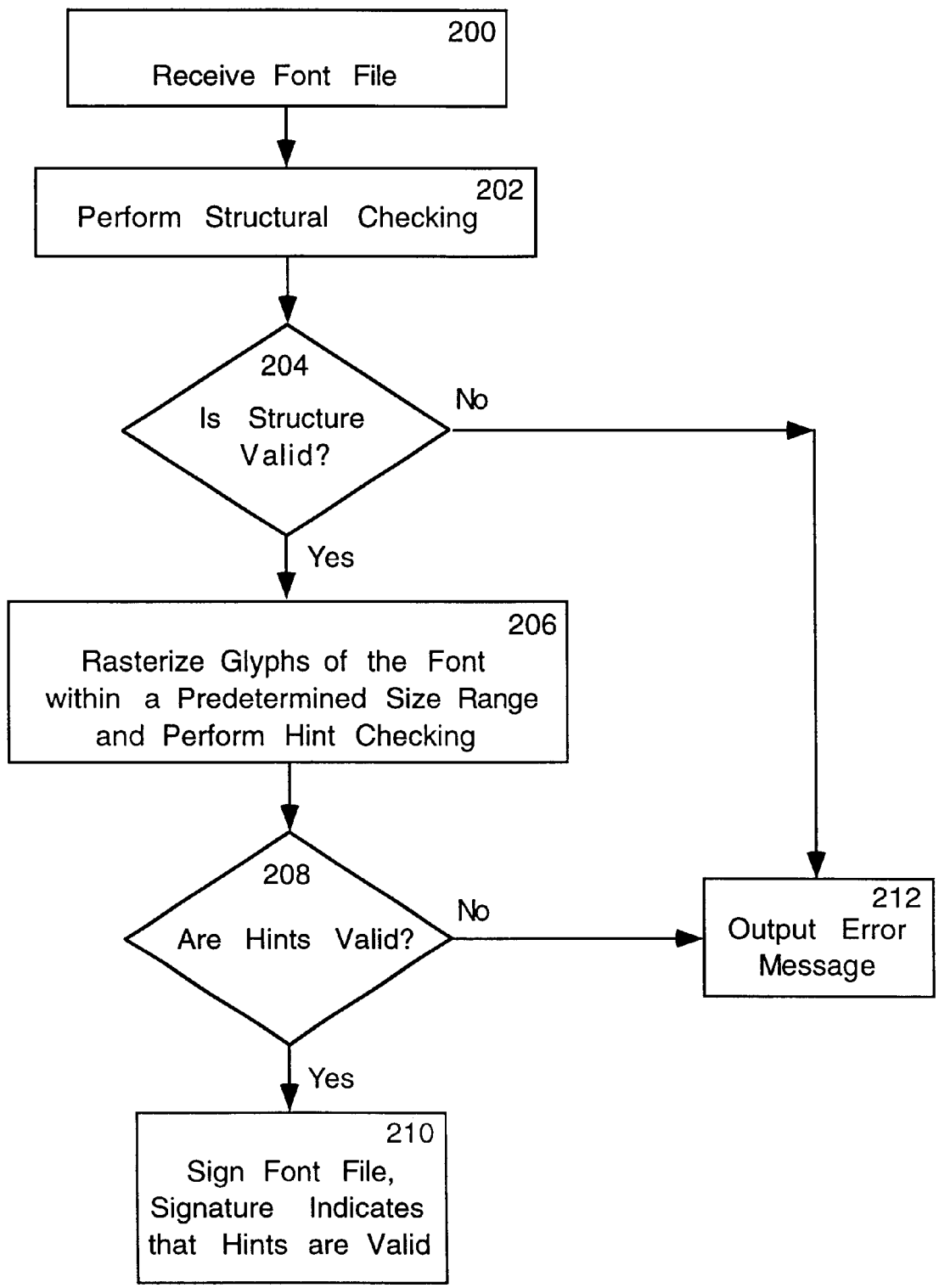
FIG. 2 is a flow diagram illustrating the steps for validating a program during the signing process.

The font file signing library can validate a font file using the steps shown in FIG. 2. In step 200, the signing library receives the font file. In step 202, the validation component performs structural checking of the font file. For a TrueType font file, the validation component checks the offsets, table boundaries, table tags, and checksums, as described above in the section entitled Validating a Font File. As will be apparent to those skilled in the art, additional types of structural checking are possible. In step 204, a determination is made as to whether the structure of the font file is valid. If the structure of the font file is valid, then the Yes branch is followed to step 206.

In step 206, the input parameters to the hints of the font file are checked. The rasterizer is used to rasterize all of the glyphs of the font within a predetermined size range to check the input parameters to the hints. For each glyph, the rasterizer performs the same steps that would be performed if the glyph were actually being rendered for display on an output device. The predetermined size range is chosen so that the most common glyph sizes are within the size range. The validation component checks the input parameter(s) to each hint for each glyph in the size range before the hint is executed by the rasterizer. The validation component knows which memory ranges are assigned to the rasterizer and determines whether the memory addresses used by the hints are within the assigned ranges. If there are additional constraints on the input parameters for a particular hint, then the validation component checks the input parameters for compliance with these additional constraints. For example, the validation component checks the control point numbers to determine whether a control point number is beyond the allowed range of control point numbers. As will be apparent to those skilled in the art, additional types of checking can be performed. If the input parameters are valid, then the next hint is checked. If the input parameters are not valid, then the hint checking is terminated.

In step 208, a determination is made as to whether the input parameters to all the hints for all the glyphs within the predetermined size range are valid. If the determination in step 208 is that the input parameters are valid, then the Yes branch is followed to step 210 and the font file is signed. The font file is signed by associating a digital signature with the font file. The digital signature includes an indication that the hints are valid. If the font file is modified after the font file has been signed, then the digital signature becomes invalid.

If the determination in step 204 is that the structure is invalid, then the No branch is followed to step 212. Similarly, if an invalid input parameter to a hint was detected, then the determination in step 208 is that the input parameters to the hints are invalid and the No branch is followed to step 212. In step 212, an error message is output to the user. Preferably, the error message identifies the failing glyph to assist the typographer in fixing the error and creating a valid font.

Determining Whether a Program is Valid Prior to Executing the Program

To prevent the execution of an invalid program, a program is checked prior to execution to determine whether the program is valid. If the program was validated when the program was signed, then the program can be executed without repeating the validation. However, if the program was not previously validated, then the program is validated at the time of execution.

Figure 3A:
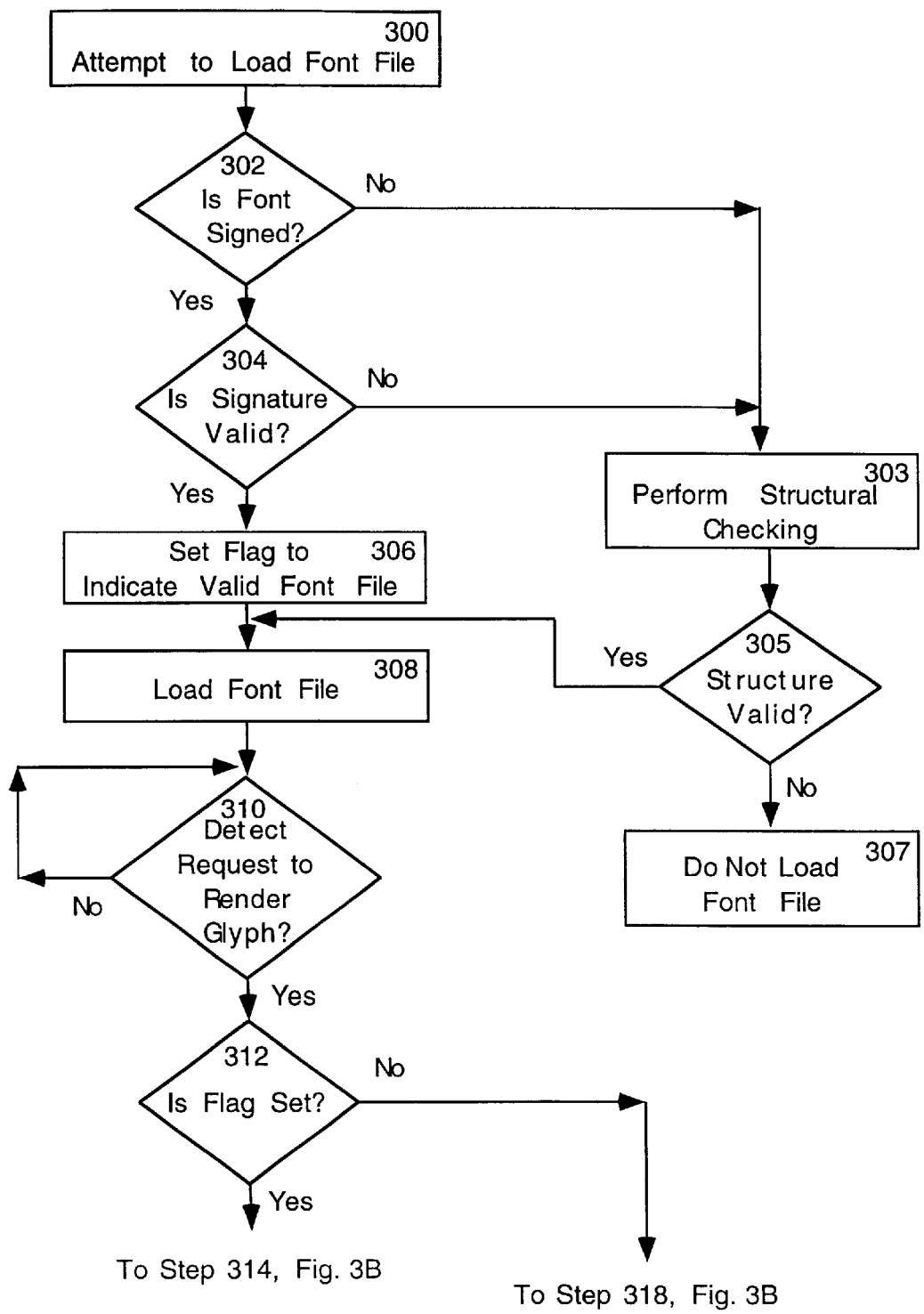
FIG. 3A is a flow diagram illustrating the steps for determining whether a program has been validated prior to executing the program.
Figure 3B:
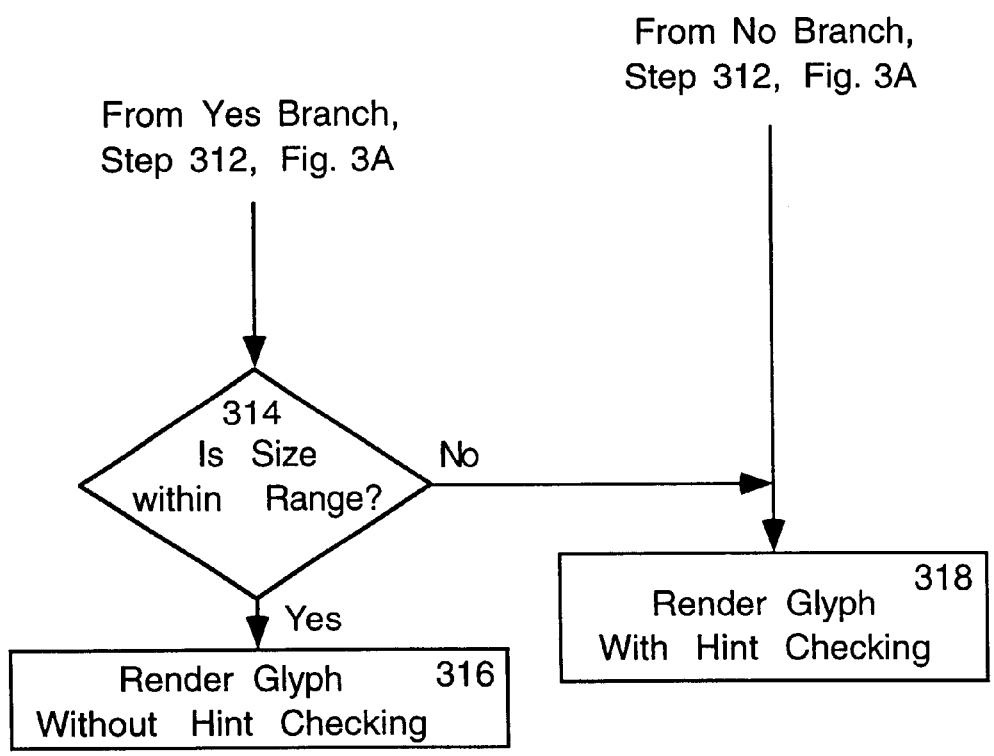
FIG. 3B is a flow diagram further illustrating the steps for determining whether a program has been validated prior to executing the program.

The steps for determining whether a program is valid prior to the execution of the program are shown in FIGS. 3A and 3B. The steps shown in FIGS. 3A and 3B are typically performed by the operating system. In step 300, an attempt is made to load the font file. The attempt can be triggered by an AddFontResource call in the "WINDOWS" operating system or by any of the AddFontResource, AddFontResourceEx or AddFontMemoryResource calls in the "WINDOWS NT" operating system, both marketed by Microsoft Corporation.

In response to the attempt to load the font file, the font file is checked to determine whether the font file is signed in step 302. If the font file is signed, then the Yes branch is followed to step 304. In step 304, a determination is made as to whether the digital signature associated with the font file is valid. To determine whether the digital signature is valid, a font signing and signature verification library equivalent to the one used by the signing tool is used. If the digital signature is valid, then a flag is set indicating that the font file is valid in step 306 and the font file is loaded in step 308. Typically, the flag is set in a data structure associated with the font. Once the font file is loaded, the font file is available for use by the operating system or an application program.

If the determination in step 302 is that the font file is not signed, then the No branch is followed to step 303. Similarly, if the determination in step 304 is that the digital signature is invalid, then the No branch is followed to step 303. In step 303, the structure of the font file is checked. The steps for checking the structure of the font file are similar to the steps described above in connection with validating a font file during the signing process. Once the structure of the font file is checked, then a determination is made as to whether the structure is valid in step 305. If the determination is that the structure is valid, then the Yes branch is followed to step 308 and the font file is loaded. If the determination is that the structure is invalid, then the No branch is followed to step 307 and the font file is not loaded.

After the font file is loaded in step 308, the font file can be used to render a glyph. The method loops on step 310 until a request to render a glyph using the font file is detected. Once a request is detected, then the Yes branch is followed to step 312. In step 312, the data structure associated with the font is checked to determine whether the flag is set. If the determination in step 312 is that the flag is set, then the Yes branch is followed from step 312 to step 314 of FIG. 3B. In step 314, the size of the glyph in the request is compared to the predetermined size range. The predetermined size range used in step 314 is the same size range used for validation during the signing process. If the size of the glyph is within the predetermined size range, then the Yes branch is followed to step 316. In step 316, the glyph is rendered without further validation.

If the determination in step 312 is that the flag is not set, then the No branch is followed to step 318 of FIG. 3B. Similarly, if the determination in step 314 is that the size of the glyph is not within the predetermined size range, then the No branch is followed to step 318. In step 318, hint checking is performed for the glyph at the time the glyph is rendered. Further details on the hint checking performed in step 318 are shown in FIG. 3C.

Validating a Program at the Time the Program is Executed

Figure 3C:
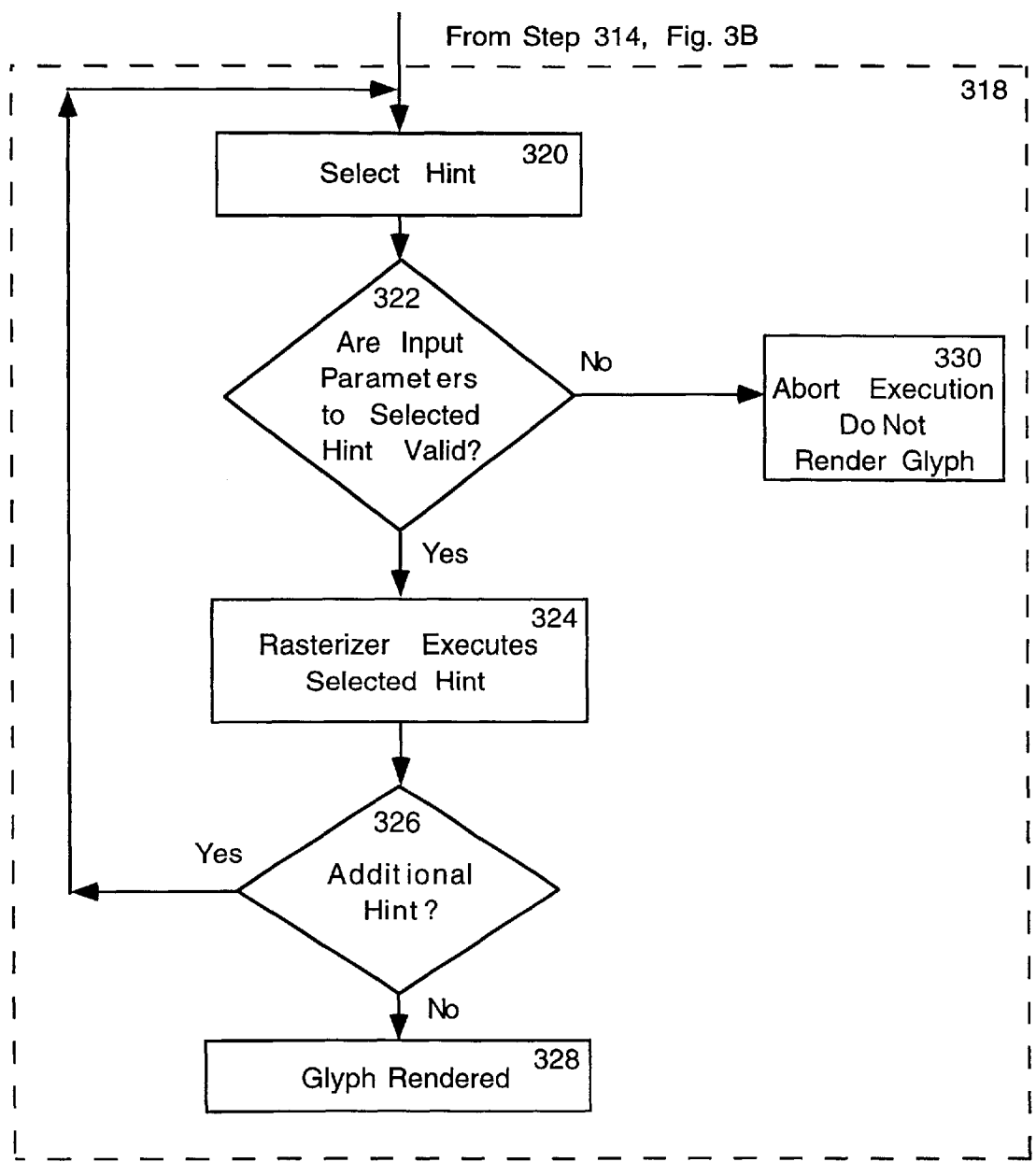
FIG. 3C is a flow diagram illustrating the steps for validating a program at the time the program is executed.

FIG. 3C illustrates the steps for checking the input parameters to the hints for a glyph at the time the glyph is rendered. The steps for hint checking are the same as the steps taken by the font file signing library to check the hints for a glyph at the time the font file is signed. The font file signing library checks the input parameters for all of the hints for all of the glyphs for the predetermined size range at the time of signing. In contrast, the steps illustrated by FIG. 3C are performed for each glyph at the time the glyph is rendered.

The steps illustrated by FIG. 3C are performed for all of the hints of the glyph. In step 320, one of the hints for the glyph is selected. The first hint of the glyph is selected during the first pass, the second hint of the glyph is selected during the second pass, and so forth. Once a hint is selected in step 320, then the input parameters for the selected hint are checked to determine whether the input parameters are valid in step 322. If the input parameters are valid, then the Yes branch is followed to step 324 and the selected hint is executed by the rasterizer. In step 326, a determination is made as to whether there is an additional hint for the glyph. If there is an additional hint, then steps 320–324 are repeated. Steps 320–324 are repeated for all of the hints of the glyph. Once the input parameters to all of the hints of the glyph have been checked, then the No branch is followed from step 326 to step 328 and the rendering of the glyph is complete.

If the determination in step 322 is that the input parameters to the selected hint are invalid, then the No branch is followed to step 330. In step 330, the execution of the hints is aborted and the glyph is not rendered. Steps 322 and 330 distinguish rendering a glyph with hint checking (step 318 of FIG. 3B) from rendering a glyph without hint checking (step 316 of FIG. 3B). To render a glyph without hint checking only steps 320, 324, 326, and 328 of FIG. 3C are performed.

Validating a Signed Program v. Validating an Unsigned Program

As discussed above in connection with FIGS. 2, 3A, 3B, and 3C a program is validated prior to execution time to prevent the execution of an instruction using an invalid input parameter. The steps for validating a program differ for a signed program and an unsigned program. If the program is signed, then the program is validated at the time the program is signed. However, if the program is not signed (or if the signature is invalid), then the program is validated at execution time.

FIG. 4 provides a high-level comparison of the steps for validating a signed font file and the steps for validating an unsigned font file. A signed font file follows the steps along the upper path and an unsigned font file follows the steps along the lower path shown in FIG. 4. FIG. 4 is divided into three phases. The first phase corresponds to the signing of the font file, the second phase corresponds to the loading of the font file, and the third phase corresponds to the execution of the font file.

Following the upper path, an unsigned font file is input into a signing tool 400 in the signing phase. The signing tool 400 links to the font file signing library and includes a validation component and a rasterizer. The validation component and the rasterizer are used to check the input parameters to the hints of the font file for a predetermined size range. If the input parameters to the hints are valid, then a signed font file is output from the signing tool 400. As shown on the lower path, an unsigned font file is not signed, and thus is not validated during the signing phase.

The loading phase follows the signing phase. The signing phase and the loading phase can occur on separate computers. During the loading phase the font file is checked to determine whether a valid digital signature is associated with the font file. As shown on the upper path, a flag is set in the font data structure 402 if the digital signature is valid. If the font file is unsigned (or if the signature is invalid), then the flag is not set, as shown on the lower path.

Once the font file is loaded, the font file can be used to render a glyph in the execution phase. To render a glyph using a validated signed font file, the upper path shows that the rasterizer 404 renders the glyph without further validation, so long as the size of the glyph is within the predetermined size range. To render a glyph using an unsigned font file, the lower path shows that the input parameters to the hints of the glyph are checked by the validation component 405 prior to execution of the hints by the rasterizer 404. The validation component 405 checks the input parameters for every hint of the glyph.

As illustrated by FIG. 4, the overhead of validating a signed program is incurred during the signing phase, whereas the overhead of validating an unsigned program is incurred during the execution phase. Because performance is more critical during the execution phase than during the signing phase, it is preferable to validate a program at the time that the program is signed.

In summary, the present invention is directed toward a method for validating an executable program prior to executing the program. The program is validated by checking the input parameters to the instructions of the program to prevent errors associated with executing an instruction using an invalid input parameter. The method accommodates both signed programs and unsigned programs. A signed program is validated during the signing process, whereas an unsigned program is validated when it is executed.

Although the method has been illustrated using a font file, as will be apparent to those skilled in the art, the method can be used with any executable program. To use the method with an executable program, other than a font file, the structural checking and the input parameter checking would need to be modified. The structural checking could include checking the information in the file header to determine whether the information is consistent with the file header specification for executable files. The input parameter checking could include checking that the memory addresses used by the instructions of the executable program are within the ranges assigned to the executable program. In addition to checking input parameters, other types of checking can also be performed to determine whether a program is valid.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for validating a program, comprising the steps of:
    (a) determining whether a valid digital signature is associated with the program prior to loading the program,
    (b) if the valid digital signature is associated with the program, then setting a flag to indicate that the program is valid;
    (c) if the valid digital signature is not associated with the program, then determining whether the program is valid when the program is executed by checking input parameters to all instructions of the program; and
    (d) if the valid digital signature is associated with the program, then executing the program at run time without checking the input parameters to all instructions of the program.

2. The method of claim 1, wherein the valid digital signature is associated with the program if the program is valid for a range of inputs to the program, further comprising the steps of:
    prior to executing the program using a selected input, checking whether the flag is set;
    if the flag is set, then determining whether the selected input is within the range of inputs; and
    if the selected input is within the range of inputs, then executing the program without further validation.

3. The method of claim 1, wherein the valid digital signature is associated with the program if the program is valid for a range of inputs to the program, further comprising the steps of:
    prior to executing the program using a selected input, checking whether the flag is set;

if the flag is set, then determining whether the selected input is within the range of inputs; and if the selected input is not within the range of inputs, then determining whether the program is valid for the selected input when the program is executed by
  (a) determining a set of input parameters to an instruction of the program;
  (b) checking the validity of the set of input parameters to the instruction;
  (c) if the set of input parameters is valid, then executing the instruction;
  (d) otherwise, terminating execution of the program; and
  (e) repeating steps (a)–(d) for subsequent sets of input parameters to subsequent instructions of the program.

4. A method for associating a digital signature with a font file containing a program that includes a plurality of hints, comprising the steps of:
  (a) checking the font file to check structural components of the font file;
  (b) checking the font file to check all input parameters to the hints of the program for a predetermined size range of glyphs;
  (c) if the structural components and the input parameters to the hints of the program for the predetermined size range are valid, then associating the digital signature with the font file, so that the digital signature is checked when the font file is subsequently loaded to determine whether the font file is valid for the predetermined size range of glyphs; and
  (d) if the structural components and the input parameters to the hints of the program are not valid, then not associating the digital signature with the font file.

5. The method of claim 4, wherein step (c) further comprises:
  if the digital signature is valid, then setting a flag to indicate that the font file is valid for the predetermined size range of glyphs.

6. The method of claim 4, wherein the digital signature is valid, and wherein step (c) further comprises:
  prior to rendering a glyph at a selected size using the font file, determining whether the selected size of the glyph is within the predetermined size range; and
  if the selected size is within the predetermined size range, then rendering the glyph using the font file without further validation of the input parameters to the hints for the selected size.

7. The method of claim 4, wherein the digital signature is valid, and wherein step (c) further comprises:
  prior to rendering a glyph at a selected size using the font file, determining whether the selected size of the glyph is within the predetermined size range; and
  if the selected size is not within the predetermined size range, then determining whether the program is valid for the selected size by:
    (a) determining a set of input parameters to a first hint of the program;
    (b) checking the validity of the set of input parameters to the first hint;
    (c) if the set of input parameters is valid, then executing the first hint;
    (d) otherwise, terminating execution of the program; and
    (e) repeating steps (a)–(d) for subsequent sets of input parameters to subsequent hints of the program.

8. A method for validating a signed program prior to execution time and an unsigned program at execution time, wherein the signed program is signed with a digital signature if the signed program is valid for a predetermined range of inputs to the signed program, comprising the steps of:
  for the signed program:
    prior to execution time, determining whether a selected input is within the range of inputs;
    if the selected input is within the range of inputs, then executing the signed program using the selected input; and
    if the selected input is not within the range of inputs, then determining whether all input parameters are valid for all instructions of the signed program during run time; and
  for the unsigned program:
    at execution time, determining whether the unsigned program is valid for the selected input by checking all input parameters to all instructions of the unsigned program for the selected input to the unsigned program.

9. The method of claim 8, further comprising the steps of:
  for the signed program, if the selected input is not within the range of inputs, then determining whether the signed program is valid for the selected input.

10. The method of claim 9, wherein the step of determining whether the signed program is valid for the selected input comprises:
  (a) determining a set of input parameters to an instruction of the program based upon the selected input;
  (b) checking the validity of the set of input parameters to the instruction;
  (c) if the set of input parameters is valid, then executing the instruction;
  (d) otherwise, terminating execution of the signed program prior to execution of the instruction; and
  (e) repeating steps (a)–(d) for subsequent sets of input parameters to subsequent instructions of the signed program.

11. The method of claim 8, further comprising the steps of:
  in response to a request to load the signed program, determining whether the digital signature is valid; and
  if the digital signature is valid, then setting a flag to indicate that the signed program is valid.

12. A computer-readable medium having computer-executable instructions comprising the steps of:
  prior to executing a program using a selected input, determining whether the program was previously validated over a range of program inputs by checking whether a valid digital signature is associated with the program;
  if a valid digital signature is associated with the program, then executing the program at run time without checking the input parameters to all instructions of the program;
  if the program was previously validated, then determining whether the selected input is within the range of program inputs;
  if the selected input is within the range of program inputs, then executing the program using the selected input without further validation; and
  if the program was not previously validated, then determining whether the program is valid for the selected input when the program is executed.

13. The computer-readable medium of claim 12, wherein the step of determining whether the program was previously validated occurs in response to a request to load the program.

14. The computer-readable medium of claim 12, wherein the program includes instructions, and wherein the step of determining whether the program is valid for the selected input comprises:
- (a) determining a set of input parameters to an instruction of the program based upon the selected input;
- (b) checking the validity of the set of input parameters to the instruction;
- (c) if the set of input parameters is valid, then executing the instruction;
- (d) otherwise, terminating execution of the signed program prior to execution of the instruction; and
- (e) repeating steps (a)–(d) for subsequent sets of input parameters to subsequent instructions of the program.

15. The computer-readable medium of claim 12, wherein the program includes instructions, further comprising the steps of:
- if the selected input is not within the range of program inputs, then determining whether the program is valid for the selected input by
  - (a) determining a set of input parameters to an instruction of the program based upon the selected input;
  - (b) checking the validity of the set of input parameters for the instruction;
  - (c) if the set of input parameters is valid, then executing the instruction;
  - (d) otherwise, terminating execution of the signed program prior to execution of the instruction; and
  - (e) repeating steps (a)–(d) for subsequent sets of input parameters to subsequent instructions of the program.

* * * * *